Aug. 7, 1945.  R. J. BALDESBERGER  2,381,099
ARTIFICIAL FISHING BAIT
Filed July 27, 1943
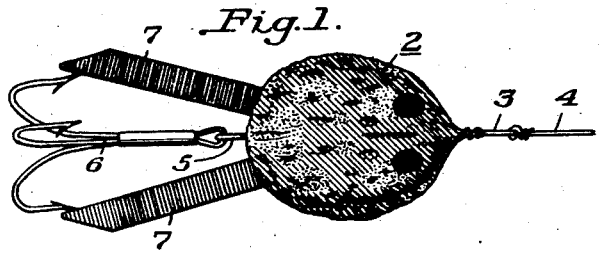
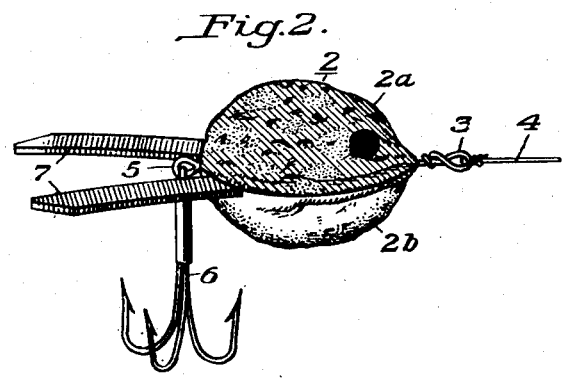
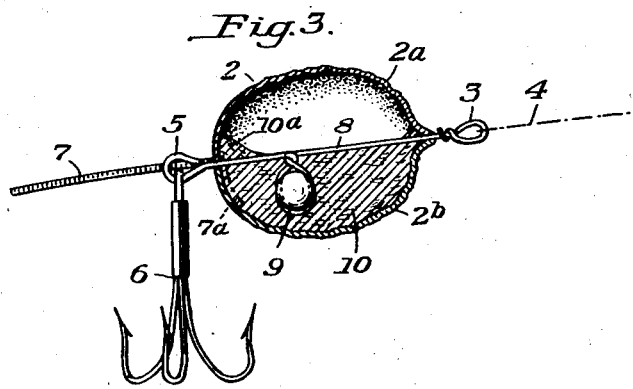
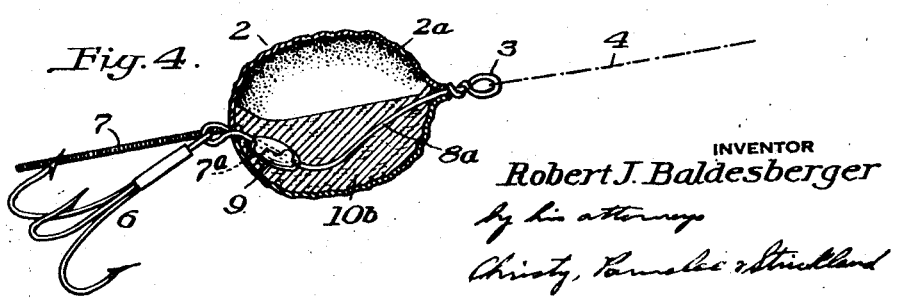
INVENTOR
Robert J. Baldesberger Patented Aug. 7, 1945

2,381,099

UNITED STATES PATENT OFFICE 2,381,099

ARTIFICIAL FISHING BAIT

Robert J. Baldesberger, Pittsburgh, Pa.

Application July 27, 1943, Serial No. 496,294

5 Claims. (Cl. 43—42)

My invention relates to artificial fish bait, and consists in particular improvements in bait construction. The device of the invention approximates the appearance of a grass-frog, and as such affords an excellent fish lure.

An important advantage of my device arises from the fact that the body portion thereof, that is, the portion which simulates a frog's body, comprises a hollow shell of distinct characteristics. The hollow shell is substantially spherical, or ellipsoidal, in form. More particularly, the shell may be formed of two shell sections that are united with each other and with the fish-hook and the other essential elements of the bait structure, and it is by virtue of this that the shell of an English walnut may with advantage be used to form the said body portion of the device. The outer surface of the shell may be coated in colors, more closely to approximate the appearance of a natural grass-frog, and as thus constituted the device provides an exceptionally effective lure for the capture of fish, especially by trolling.

In the accompanying drawing,

Fig. 1 is a top plan view of a bait or lure embodying the invention;

Fig. 2 is a view of the device in perspective;

Fig. 3 is a sectional view of the lure on a vertical, medial plane;

Fig. 4 is a view comparable with Fig. 3, illustrating certain modifications in the structure of the device.

Referring to the drawing the bait or lure of the invention comprises a body 2, an eye 3 for the attachment of a fishing line 4, an eye 5 for the articular attachment of a fish-hook 6, and two members 7 that extend divergently from the body 2, one on each side of the fish-hook. The body 2 is of a shape suggesting in certain aspects the body of a grass-frog, and the members 7 approximate the appearance of the rear legs of the frog. In further approximation of the appearance of a natural frog, the top of the shell is preferably mottled green and gold closely resembling the natural coloring of a frog, and the bottom white or light grey; and two black dots are painted on in the positions shown, to represent the eyes of the creature.

The body 2 is formed of two elements 2a and 2b, which consist of the two halves of an English walnut shell. As appears in greater detail below, the two shell elements are united edge to edge, by means of a water-proof cement. The loop or eye 3 for the attachment of the fishing line is provided at the pointed end of the shell, and it will be noted that such pointed end of the shell and the meeting edges of the shell elements provide a likeness of the mouth of a frog. When the device is drawn through the water, as it is when trolling for fish, it is desired that the device shall be positioned with the leading or pointed end of the body 2 slightly higher than the trailing end, from which the fish-hook 6 and leg members 7 extend, as shown in Fig. 3. It is to be noted, however, that the fish-hook will not extend vertically when the device is moving through the water, but will extend more nearly in horizontal position between the leg members 7.

The members 7 are formed of strips of flexible material, such as sheet rubber or leather, and extend from the body in trailing position, with respect to the direction in which the bait is trolled through the water, and by virtue of their form and flexibility the leg members, under the drag imposed by the water, are caused to oscillate or undulate, and thereby to wabble the bait. The so moving leg members not only operate as a bait wabbler, but also afford a simulation of the legs of a swimming frog.

The body 2 is protected from the stresses produced when a fish strikes the bait and is caught, and the means to this end comprise a tension element 8, formed in this case of copper wire that extends through and on the major axis of the ellipsoidal body 2. The loops or eyes 3 and 5 for the attachment of the fishing line and hook, respectively, are formed in the opposite ends of the wire 8, and thus it is that the hook is in effect secured immediately to the fishing line, with the body 2 safeguarded from disruptive strain.

In order that the bait shall remain in proper position as it is drawn through the water, the mass of the lower portion of the hollow body 2 is increased by means of a weight 9 of lead, locked in a closed and twisted bight in the wire 8, and a filling 10 of a suitable cementitious material. In the structure herein illustrated, the filling 10 consists of plastic wood that is molded within the shell element 2b before the two shell elements are united by means of a water-proof cement. The weight 9, and the bight portion of the wire on which it is mounted, are embedded in the filling, as shown, and by thus securing the weighted bight of the wire 8 within the substance of the filling 10, the body 2 is secured against rotation upon the wire, which rotation would tend to create openings through which leakage of water into the body 2 would occur. The flexible leg members 7 are at their inner ends 7a anchored in the body of the filling, said ends of the leg members being turned downward upon the inner surface of the shell element before the plastic filling material is shaped and solidified therein. Both the weight 9 and the plastic wood add weight to the lower half of the bait so that the white side of the bait always is under when the bait is floating, and the angle of float, buoyancy and weight can be controlled by the amount of plastic wood in the body, the size of the weight, and the size of the air pocket.

The edge of the lower shell element 2b is notched to receive the portions of the leg members 7 and wire element 8 that in the assembled structure lie between the meeting edges of the two shell elements. The body of filling material 10 is extended upward, as at 10a, to cover and seal the notches through which said leg members and the trailing end of said wire extend.

Fig. 4 illustrates that, if desired, the portion of the wire element 8a within the body 2 may be entirely embedded in the filling 10b, with the weight 9a of lead simply clenched upon the body of the wire.

Fig. 3 and 4 illustrate the inclined position of the bait as it is drawn through the water when trolling. The mass of the structure described is such that the bait will travel at the surface of the water, with only the pointed end of the body 2 extending above the water. However, if it be desired that the bait shall be entirely submerged, a sinker will be added to the fishing line 4 at a point adjacent to the bait, and, by selection of the size of sinker used, the depth at which the bait will travel in the water may be established.

It is contemplated that the shell elements 2a and 2b, of which the body 2 of the bait is made, may be produced in substantially the form shown of sheet metal, or they may be molded of plastic material, and united in a water-tight joint. If formed of plastic material, the mass-increasing effect desired in the lower body element 2b may be obtained by molding such body and filling as a solid, the inner ends of the leg members 7 and the weighted wire 8 being set in the mold and the plastic material shaped and solidified upon and around them. These, and other, modifications are to be recognized within the terms of the appended claims.

I claim as my invention:

1. An artificial fish bait comprising a hollow body formed of two shell elements united edge to edge, one shell element including a mass-increasing filling, a wabbler of flexible material embedded and secured at one end in said filling and extending outward from the assembled shell elements, with the filling material overlapped upon the meeting edges of the shell elements between which the wabbler extends, a fish-hook, and means for attaching a fishing line.

2. An artificial fish bait comprising a hollow body formed of a plurality of united shell elements, at least one of said shell elements including a mass-increasing filling, a fish-hook, a stress-sustaining element having at one end means for attaching a fishing line and extending from such means through said hollow body and secured at its opposite end to said fish-hook, and two flexible wabbler members anchored in said filling and extending outward from said body on opposite sides of the fish-hook.

3. The structure of claim 2, wherein said hollow body is formed of the two halves of a nut shell.

4. The structure of claim 2, said stress-sustaining element comprising a metal wire including a weighted loop embedded in said filling and serving to secure said hollow body and wire against relative rotation.

5. An artificial fish bait comprising a body formed of the two halves of a nut shell, said halves being united edge to edge, and one of the shell halves including a mass for increasing the weight thereof, means provided at one end of such body for the attachment of a fishing line, a fish-hook attached at the opposite end of such body, and two members comprising strips of flexible material anchored in said mass and extending outward between the united edges of the shell halves, one on each side of said fish-hook, to form wabblers.

ROBERT J. BALDESBERGER.